United States Patent [19]

Saha et al.

[11] Patent Number: 5,577,528
[45] Date of Patent: Nov. 26, 1996

[54] APPARATUS FOR UPGRADE OR REPAIR OF IN-SERVICE PIPELINES

[75] Inventors: Narayan C. Saha, Lake Villa; Gregory J. Drzewiecki, Oak Lawn; Chi M. Lei, Chicago, all of Ill.

[73] Assignee: Southern California Gas Company, Los Angeles, Calif.

[21] Appl. No.: 342,341

[22] Filed: Nov. 18, 1994

[51] Int. Cl.$^6$ .............. F16K 43/00; H05B 3/48; H05B 3/58

[52] U.S. Cl. .............. 137/315; 137/240; 137/318; 138/97; 156/273.9; 156/381; 156/499; 156/556; 219/535; 285/21.2

[58] Field of Search .............. 137/15, 240, 315, 137/318; 138/94, 97; 219/535; 29/402.07, 402.16, DIG. 13; 156/273.9, 274.2, 381, 499, 556; 285/21 A

[56] References Cited

U.S. PATENT DOCUMENTS

| | | | |
|---|---|---|---|
| 152,184 | 6/1874 | Sperring | 137/318 |
| 1,590,186 | 6/1926 | Fanselow | 137/318 |
| 2,840,100 | 6/1958 | Stephenson | 137/318 |
| 2,984,129 | 5/1961 | Allen | 137/318 |
| 3,385,314 | 5/1968 | Thompson | 137/318 |
| 3,743,566 | 7/1973 | Louthan et al. | 285/21 A |
| 3,863,667 | 2/1975 | Ward | 137/318 |
| 3,867,964 | 2/1975 | Gardner | 137/318 |
| 4,271,870 | 6/1981 | Butler | 137/318 |
| 4,355,656 | 10/1982 | Smith | 137/318 |
| 4,486,650 | 12/1984 | Bridgstock et al. | 219/544 |
| 4,515,177 | 5/1985 | Thalmann et al. | 137/318 |
| 4,527,586 | 7/1985 | Yano et al. | 137/318 |
| 4,552,170 | 11/1985 | Margrave | 137/318 |
| 4,571,488 | 2/1986 | Reeves | 219/544 |
| 4,883,085 | 11/1989 | Weller et al. | 137/315 |
| 4,994,655 | 2/1991 | Handa et al. | 219/535 |
| 5,052,431 | 10/1991 | Jiles | 137/318 |
| 5,063,957 | 11/1991 | Yano et al. | 137/318 |
| 5,138,136 | 8/1992 | Moreau et al. | 219/505 |
| 5,183,364 | 2/1993 | Hardwig | 137/318 |
| 5,345,964 | 9/1994 | Friedel | 137/318 |
| 5,348,045 | 9/1994 | Servé | 137/318 |

Primary Examiner—George L. Walton
Attorney, Agent, or Firm—Speckman, Pauley & Fejer

[57] ABSTRACT

A removable apparatus for upgrade of an in-service pipeline without disrupting the flow of fluid within the in-service pipeline. The removable apparatus comprises at least one enclosure having a top section and a bottom section for temporarily enclosing a pipe section of the in-service pipeline. The top section and bottom sections are sealably disposable around the pipe section. A repairing mechanism for repairing the pipe section or an insertion mechanism for inserting and connecting a pipeline element to the pipe section is disposed within the enclosure.

14 Claims, 5 Drawing Sheets

APPARATUS FOR UPGRADE OR REPAIR OF IN-SERVICE PIPELINES

BACKGROUND OF THE INVENTION

1. Field of the Invention

This invention relates to a removable and reusable apparatus for safe, cost-effective upgrade or repair of in-service pipelines without the interruption of flow within such pipelines.

2. Description of Prior Art

Numerous devices are taught by the prior art for insertion of plugs or flow control valves into in-service pipelines without interrupting the flow through said pipelines. Electrofusion as a means for securing a pipe fitting to a plastic pipe, or otherwise coupling thermoplastic pipes, is also taught by the prior art.

Jiles, U.S. Pat. No. 5,052,431, teaches a method and apparatus for sealing a gas pipe carrying gas under pressure and, if desirable, for providing a tap in the gas pipe whereby a bypass around a damaged section of the pipe may be effected. In accordance with the teachings of the '431 patent, two branching saddles are bonded by conventional means to the side of the pipe at a distance from each other. The branching saddles are provided with a cylindrical pipe stub through which plugging or tapping of the pipe is accomplished. A fixture is mounted on the pipe stubs of the branching saddles. The fixture provides a bypass for the gas flowing in the in-service pipe between the branching saddles. Once the repair is made, gas flow through the pipe between the branching saddles is restored, the pipe stubs of the branching saddles are plugged, and the fixture is removed, leaving the branching saddles and plugged cylindrical pipe stubs on the in-service pipe.

Weller et al., U.S. Pat. No. 4,883,085, teaches a method and apparatus for installing plastic fittings and line stopping mechanisms in an in-service pipeline having a stopper shaft which is used to remove a completion plug in the fitting during installation, and to control the line stopper mechanism once it is installed within the fitting. Installation of the fitting is accomplished using electric resistance fusing.

Ward, U.S. Pat. No. 3,863,667, teaches a shear disposed within a fluid tight housing permanently secured to the exterior of an in-service pipeline operable by an external actuator through an aperture in the housing. The aperture is sealed by the shear when the shear is retracted from the pipeline to permit the actuator and related components to be separated from the housing without loss of fluid from the severed pipeline. Similarly, Smith, U.S. Pat. No. 4,355,656 teaches a shear and bypass apparatus, the shear cutting the pipe for insertion of a plug and simultaneously providing flow through a bypass so that flow through the in-service pipeline is not interrupted.

Gardner, U.S. Pat. No. 3,867,964, teaches a flow control apparatus installed into an in-service pipeline having a cutter enclosed in a fluid tight housing disposed around the pipeline. The '964 patent also teaches that a pair of said apparatuses may be connected to the pipeline to provide a bypass pipe circuit.

Margrave, U.S. Pat. No. 4,552,170, teaches a valve inserted into an in-service pipeline. The valve is separable into two halves which are clamped around the pipeline. A valve handle is then rotated to drive a cutter through the line and to position an expandable seal across the line bore.

Reeves, U.S. Pat. No. 4,571,488, teaches a thermoplastic heat-fusion pipe fitting system comprising a thermoplastic heat-fusion pipe fitting with a body portion to accommodate a pipe, and a shaped portion bearing a code indicative of the amount of heat required to effect fusion of the fitting. Also provided are means for heating the fitting, means for sensing and decoding the code, and control means for regulating the amount of heat applied to the fitting.

Handa et al., U.S. Pat. No. 4,994,655, teaches an electrofusion joint for formation of a socket-type pipe joint or a saddle-type joint. Bridgstock et al., U.S. Pat. No. 4,486,650, teaches an electro-fusion fitting for coupling thermoplastic pipe. Furthermore, Moreau et al., U.S. Pat. No. 5,138,136, teaches an electric power supply for an electrical resistive heating element suitable for construction or repair of pipe systems made from plastic material.

Although numerous prior art references teach apparatuses for insertion of pipeline accessories into in-service pipelines, they teach permanently affixing a housing or fixture to the pipeline. Consequently, the housing or fixture that remains on the pipeline may not be reused at another pipeline location and is abandoned at the repair site. Alternatively, housings which are known to be reusable generally require elaborate preparatory measures prior to initiation of line-stopping operations, such as the attachment by electrofusion of an expensive saddle fitting to the pipe, resulting in the passage of a substantial amount of time before line-stopping operations can be undertaken. Furthermore, the prior art teaches installation of pipeline elements specially adapted for use with a particular installation apparatus, thereby, prohibiting the installation of other widely used and commercially available pipe elements.

SUMMARY OF THE INVENTION

It is an object of this invention to provide an apparatus for upgrade and repair of in-service pipelines without taking such pipelines out of service.

It is an object of this invention to provide an apparatus for upgrade and repair of in-service pipelines which does not require the construction of a separate bypass around pipe sections upgraded or repaired.

It is an object of this invention to provide an apparatus for upgrade and repair of in-service pipelines which does not require abandonment of specialized fittings or similar devices after upgrade or repair of such pipelines other than those fittings that join the new pipe sections together.

It is an object of this invention to avoid time-consuming attachment by electro- or heat fusion of fittings to an in-service pipeline prior to the upgrade or repair work, thereby enhancing the emergency response of the system.

It is another object of this invention to allow the use of in-line couplings for the intended operation and for repair of the pipelines rather than the use of conventional saddle fittings which do not have the superior joining ease and performance history afforded by in-line couplings.

It is an object of this invention to provide an apparatus for upgrade and repair of in-service pipelines which can be removed and reused after the upgrade or repair has been completed.

It is an object of this invention to provide an apparatus for replacing pipe sections of in-service pipelines with commercially available pipeline elements such as valves, measuring devices, or pipe sections.

It is another object of this invention to provide an apparatus for upgrade and repair of in-service pipelines which uses conventional pipe cutting elements to effect such upgrades or repairs.

It is yet another object of this invention to accomplish the above objectives without allowing fluid within the in-service pipelines to escape unintentionally.

These and other objects are achieved by a removable apparatus according to one embodiment of this invention comprising enclosure means for temporarily enclosing a pipe section of an in-service pipeline, said enclosure means comprising an enclosure having a top section and a bottom section sealably disposable around a pipe section of an in-service pipeline and securable to each other. Disposed within the enclosure is an insertion means for inserting a pipeline element into said in-service pipeline and/or repair means for repairing the pipe section disposed within the enclosure.

In accordance with one embodiment of this invention, said insertion means and/or said repair means comprise cutting means for cutting the pipe section, positioning means for positioning the cutting means and pipeline element within the enclosure, and drive means for driving the cutting means.

In accordance with another embodiment of this invention, a support structure connects and supports two vertical plates at a distance from each other. The vertical plates are vertically oriented with respect to the in-service pipeline which is disposed between top and bottom sections of each vertical plate. An enclosure is slidably mounted on a facing surface of each vertical plate. The mounting surface of each enclosure forms a pipeline slot for receiving said in-service pipeline. Disposed within each enclosure are insertion means for inserting a pipeline element into said pipeline and/or repair means for repairing said pipeline.

BRIEF DESCRIPTION OF THE DRAWINGS

The above mentioned and other features of this invention and the manner of obtaining them will become more apparent, and the invention itself will be best understood by reference to the following description of specific embodiments of the invention taken in conjunction with the accompanying drawings, in which.

DESCRIPTION OF PREFERRED EMBODIMENTS

Figure 1:
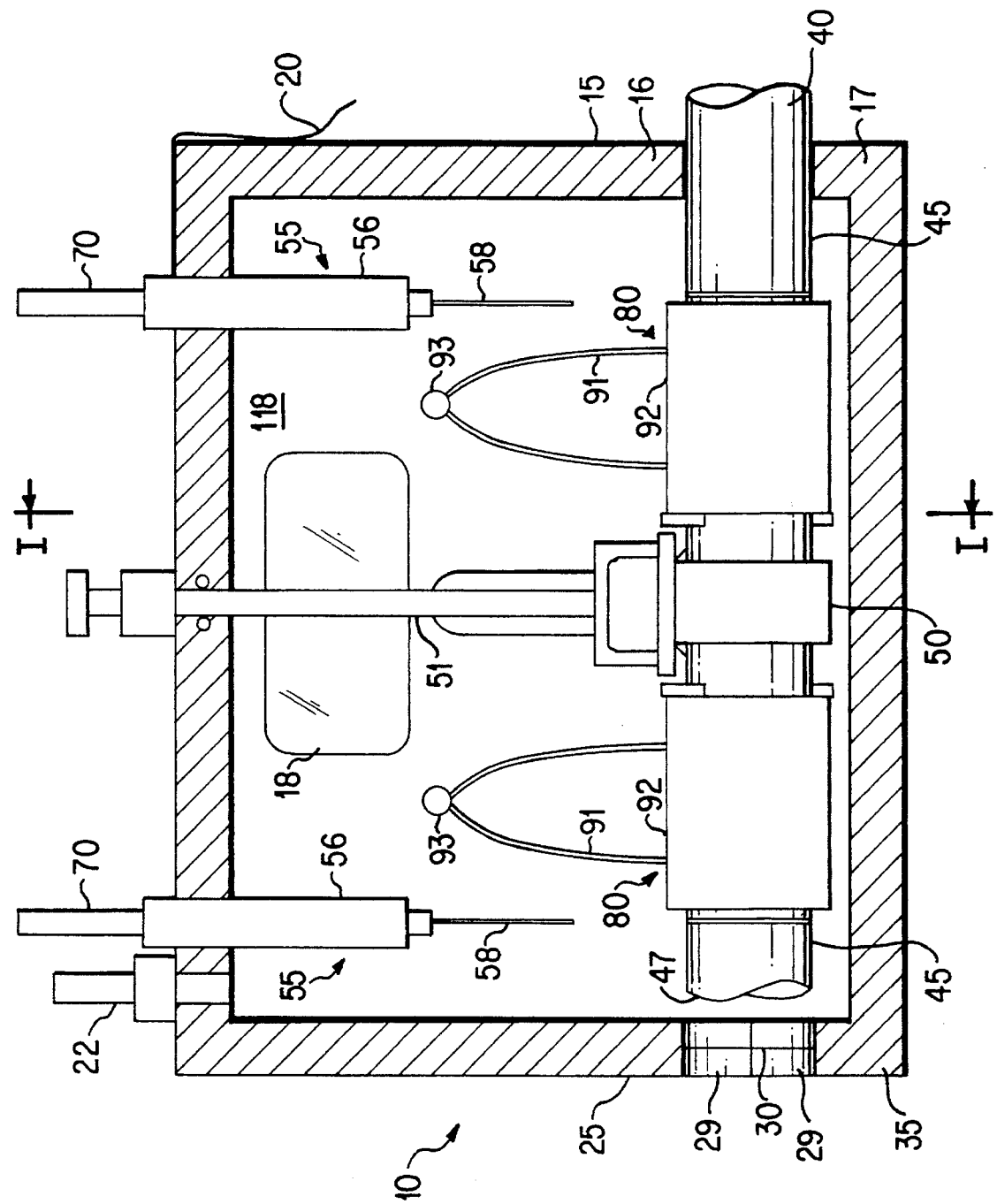
FIG. 1 is a cross-sectional side view of the apparatus in accordance with one embodiment of this invention shown mounted on an in-service pipeline.
Figure 2:
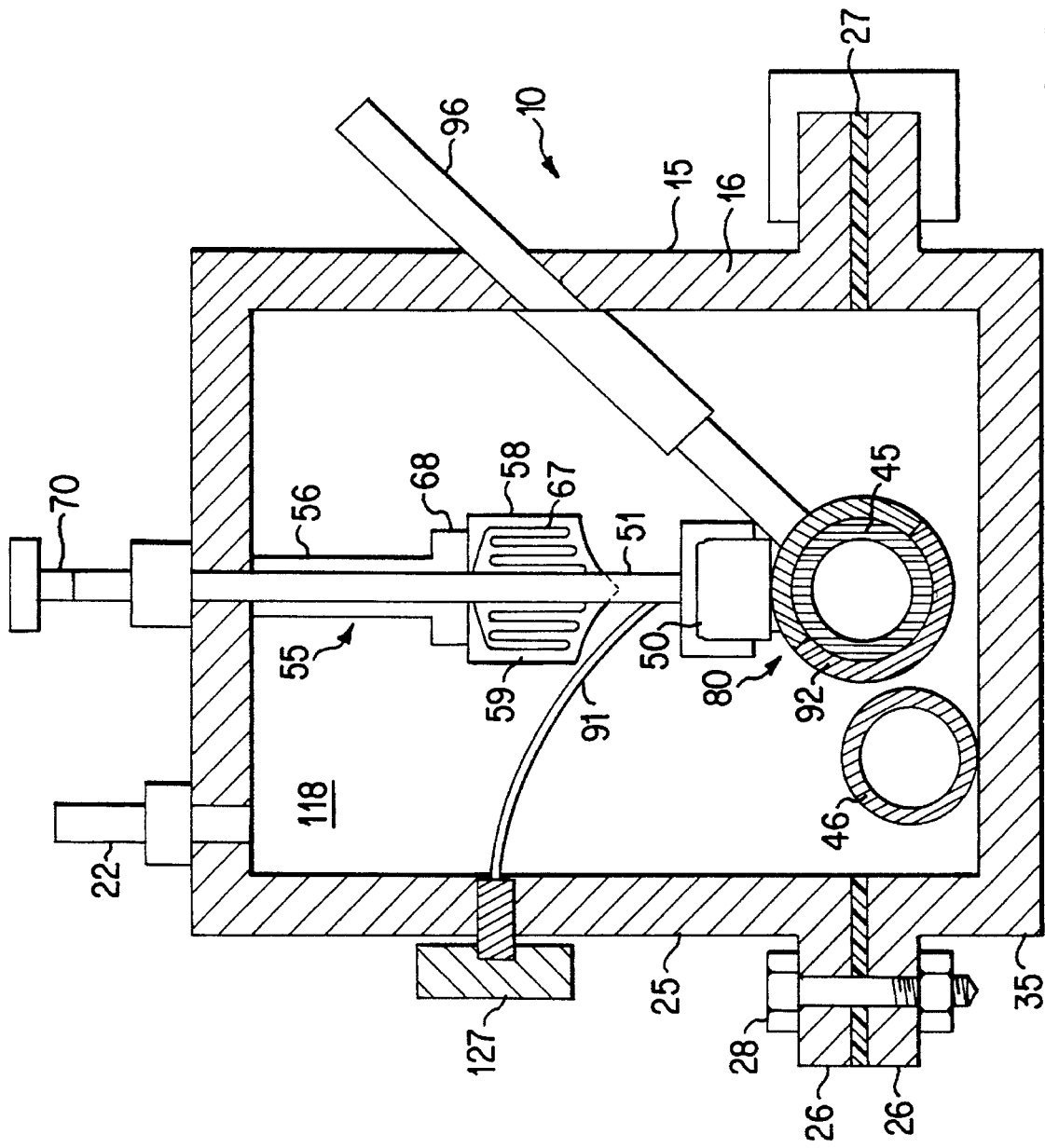
FIG. 2 is a cross-sectional view of the apparatus shown in FIG. 1 taken along line I—I.

FIG. 1 illustrates removable apparatus 10 for upgrade or repair of in-service pipeline 40 according to one preferred embodiment of this invention. Although in this preferred embodiment, removable apparatus 10 is directed at upgrade and repair of plastic in-service pipelines 40, it is apparent that removable apparatus 10 may be applied to in-service pipelines 40 made of other materials, such as metal. As shown in FIGS. 1 and 2, removable apparatus 10 comprises enclosure 15 which has top section 25 and bottom section 35. In FIG. 1, top section 25 and bottom section 35 are shown disposed around pipe section 45 of in-service pipeline 40, enclosing pipe section 45. Semi-circular cut-outs 29 are formed by enclosure wall 16 of top section 25 and enclosure wall 17 of bottom section 35, surrounding in-service pipeline 40. Split seals 30 situated in semi-circular cut-outs 29 form a fluid-tight seal between enclosure 15 and in-service pipeline 40. As shown in FIG. 2, top section 25 and bottom section 35 each have flanges 26, which are fastened to each other by threaded fasteners 28, thereby securing top section 25 to bottom section 35. Gasket 27 provides a fluid-tight seal between flanges 26 of top section 25 and bottom section 35. Although in this preferred embodiment, enclosure 15 is provided with semi-circular cut-outs 29, split seals 30, flanges 26, threaded fasteners 28, and gasket 27 for sealably securing top section 25 to bottom section 35, and for sealably disposing top section 25 and bottom section 35 around pipe section 45, it will be apparent to those skilled in the art that top section 25 can be sealably secured to bottom section 35 and top section 25 and bottom section 35 can be sealably disposed around pipe section 45 in other ways, such as, for example, substituting clamping devices for threaded fasteners 28. Furthermore, although enclosure 15 is shown in FIGS. 1 and 2 as having a rectangular shape, other shapes may be employed.

Disposed in enclosure 15 are insertion means for inserting and connecting pipeline element 50 into pipe section 45. In one preferred embodiment, as shown in FIGS. 1 and 2, the insertion means comprise cutting devices 55, cutting element positioning devices 70, electrofusion connecting devices 80, and pipe element positioning device 51. Repair mechanisms for repairing pipe section 45, such as electrofusion connecting device 80 for fusing electrofusion fitting 92 to a break in pipe wall 47 of pipe section 45, may be disposed in enclosure 15 as well.

It is apparent from FIGS. 1 and 2 that top section 25 is appropriately sized to contain the insertion mechanisms. Similarly, in other preferred embodiments top section 25 is appropriately sized to contain repair mechanisms instead of, or in addition to, the insertion mechanisms. Furthermore, as shown in FIG. 2, bottom section 35 of enclosure 15 is sized to receive pipe section portion 46 after it has been removed from pipe section 45, and top section 25 is sized to contain pipeline element 50 which may comprise a valve, a measuring device, a replacement pipe section, a branch connection, or any other similar commercially available pipeline accessory.

After top section 25 and bottom section 35 are sealably disposed around pipe section 45, cutting elements 58 of cutting devices 55 driven by drive mechanisms 56, and positioned by cutting element positioning devices 70 cut pipe section 45. Cutting element 58 may be curved edged blade, straight edged blade, circular blade, drill, or any other appropriate instrument for cutting through pipe wall 47 which may be made of plastic, metal or other suitable materials. As cutting element 58 cuts through pipe wall 47 of pipe section 45, side face 59 of cutting element 58 contacts fluid flowing in in-service pipeline 40. To avoid interruption of fluid flow within in-service pipeline 40 during the cutting operation, side face 59 of cutting element 58 may be perforated, as, for example, shown in FIG. 4, thereby allowing fluid flowing through pipe section 45 to flow through cutting element 58. However, if interruption of fluid flow during the cutting operation is desired, side face 59 of cutting element 58 may be solid, as shown in FIG. 2, having a sufficient surface area to close off an open end of pipe section 45, thereby interrupting the flow within in-service pipeline 40. Cutting element 58 may be heated by heating device 67 and/or ultrasonically vibrated by ultrasonic vibration device 68 to assist in the cutting of pipe section 45 as shown in FIG. 2.

After completing the cutting operation, pipeline element positioning device 51 moves pipeline element 50 into position for connection to pipe section 45. Electrofusion connecting device 80 is then used to connect pipe section 45 to pipeline element 50. As shown in FIGS. 1 and 2, electrofusion extension cables 91 are connected to electrofusion fittings 92 at one end, and to cable connectors 93 at another end. Electrofusion fitting positioning devices 96, which are shown in FIG. 2 as movable forks, slide electrofusion fittings 92 into position over abutting ends of pipeline element 50 and pipe section 45. In another preferred embodiment, a screw drive device slides electrofusion fittings 92 over abutting ends of pipeline element 50 and pipe section 45, while in still another embodiment, electrofusion positioning devices 96 are spring activated. Furthermore, although in the preferred embodiment shown in FIGS. 1 and 2, electrofusion connecting devices 80 sealably connect pipeline element 50 to pipe section 45, various other connecting devices may be used.

Cable connectors 93, which are mounted on the inside of enclosure wall 16, provide for the connection of an external electric power source 127 to electrofusion extension cables 91 and electrofusion fittings 92. Although in FIG. 2 electrofusion extension cables 91 and cable connectors 93 connect external electric power source 127 to electrofusion fittings 92, any suitable electric power source disposed within or outside of enclosure 15 may be connected to electrofusion fittings 92 with suitable electrically conductive conduits.

After electrofusion fittings 92 sealably connect pipeline element 50 to pipe section 45, enclosure 15 may be removed and reused at another location along in-service pipeline 40. Purge valve 22 allows fluid to be purged from interior chamber 118 after the upgrade or repair of pipe section 45 is completed.

Enclosure 15 may also be provided with view port 18, as shown in FIG. 1, a closed circuit television system, or the like, for monitoring the operations taking place within enclosure 15.

Grounding wire 20 may also be provided to discharge static electricity built-up in the insertion mechanisms.

Figure 3:
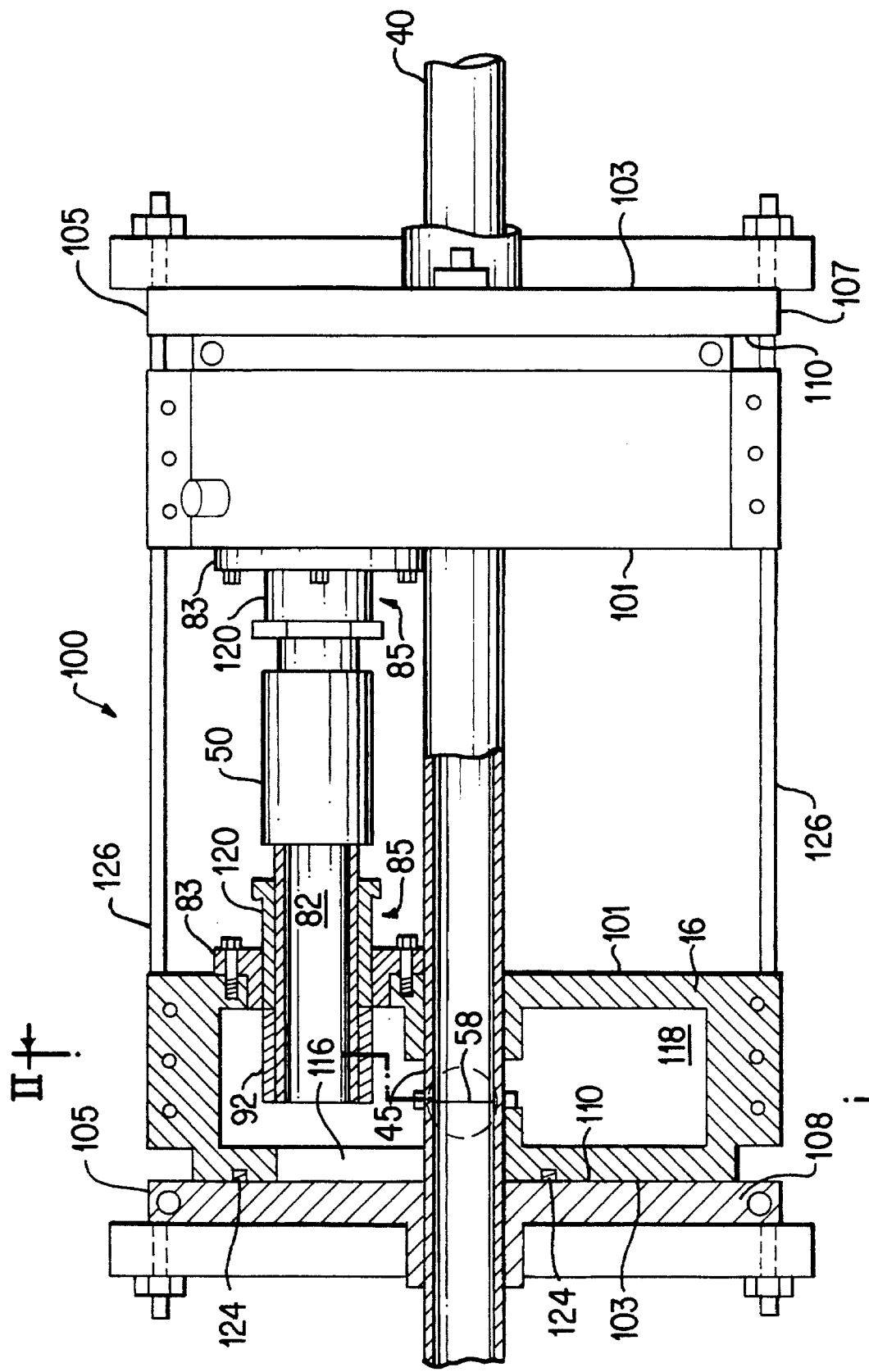
FIG. 3 is a partial cross-sectional side view of the apparatus in accordance with another embodiment of this invention mounted on an in-service pipeline.
Figure 4:
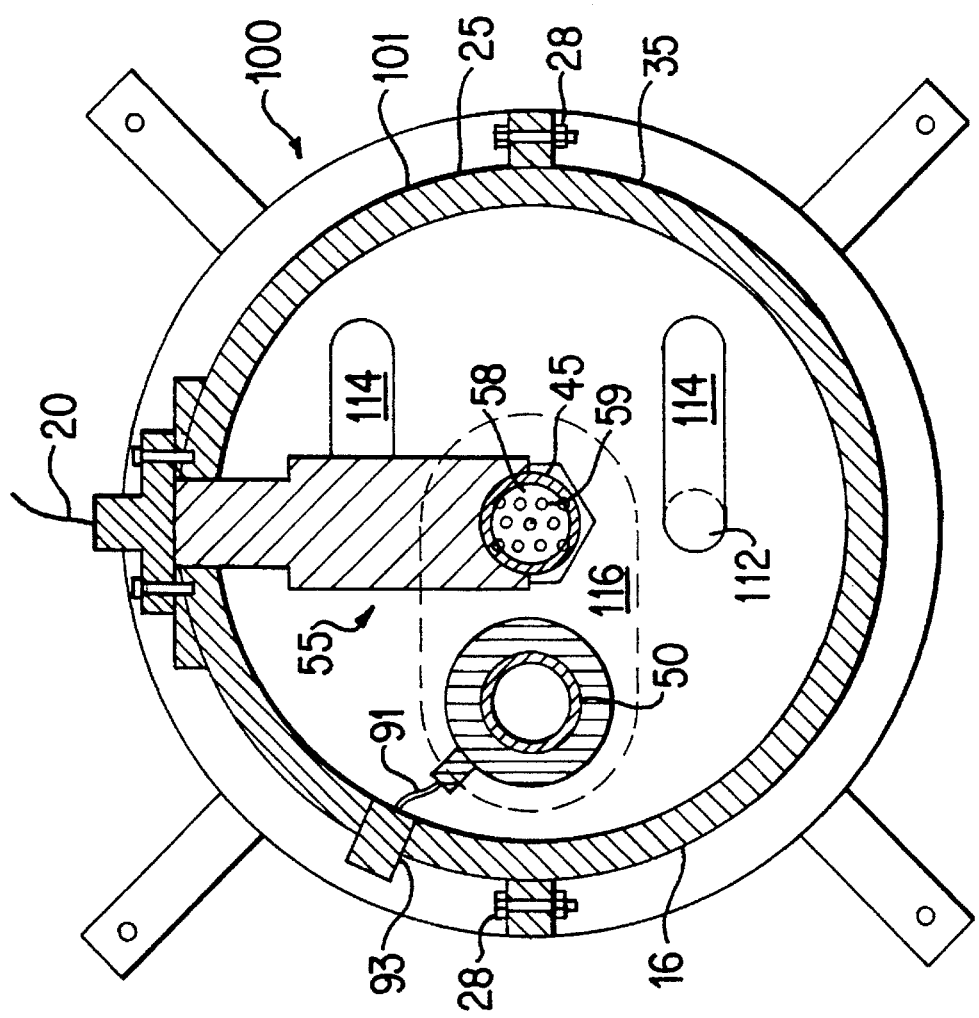
FIG. 4 is a cross-sectional view of the apparatus shown in FIG. 3 taken along line II—II.
Figure 5:
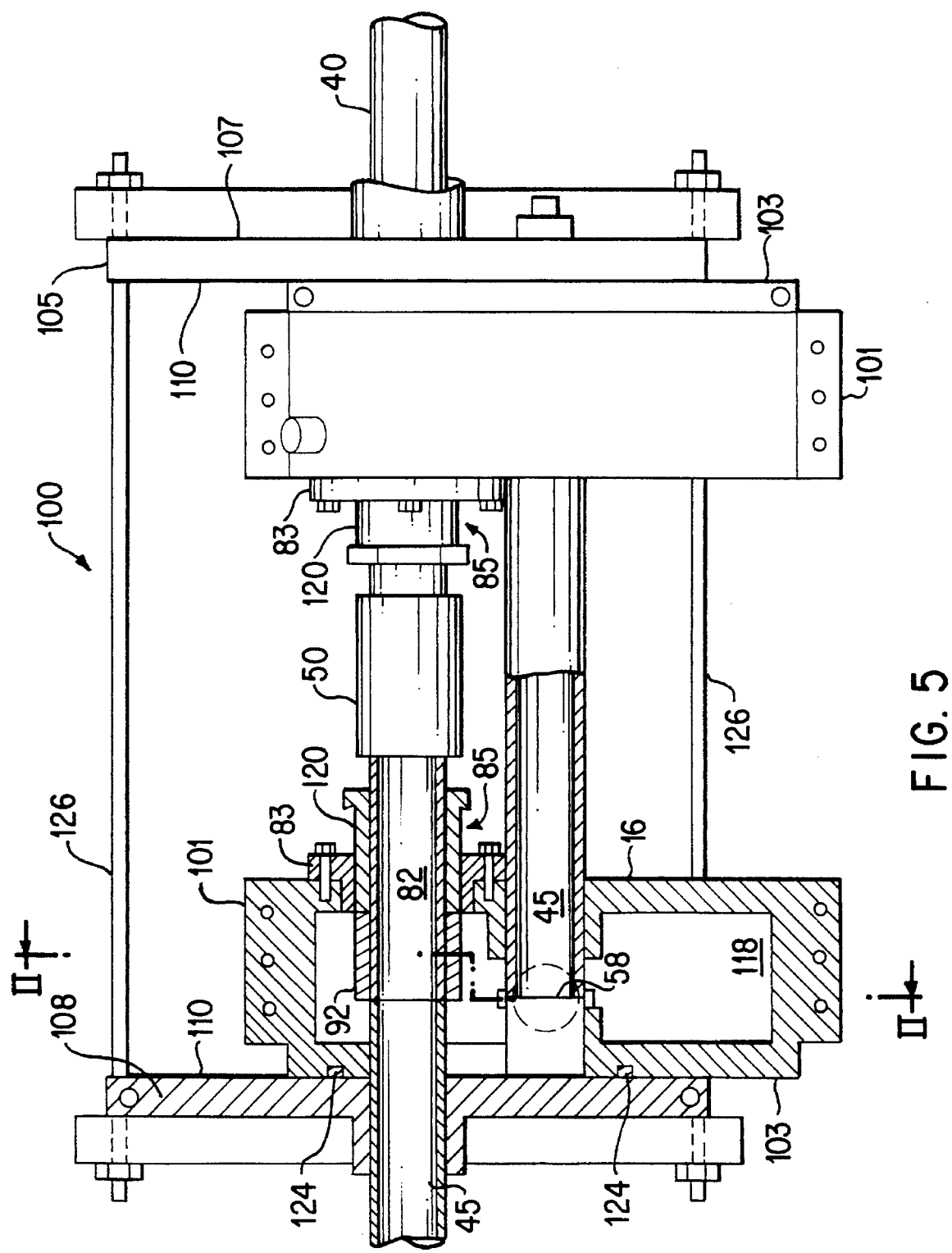
FIG. 5 is a partial cross-sectional side view of the apparatus as shown in FIG. 3 with a pipe element replacing a section of an in-service pipeline.

In accordance with another embodiment of this invention, removable apparatus 10 comprises two enclosures 101 connected to each other by support structure 100 and displaceable around in-service pipeline 40 in tandem. As shown in FIGS. 3–5, support structure 100 connects and supports two vertical plates 105 at a distance from each other. This distance can be varied to accommodate pipeline elements 50 of differing lengths by varying the lengths of support rods 126. However, in other embodiments, mechanical means such as a crank and gear sector, a lead screw, or like devices, may be used to provide the capability of varying the distance between vertical plates 105. Vertical plates 105 are vertical with respect to pipe section 45. Top sections 107 and bottom sections 108 of vertical plates 105 are disposed and secured around in-service pipeline 40. Two enclosures 101 are slidably mounted on facing surfaces 110 of vertical plates 105. As shown in FIG. 4, support pins 112 of enclosure 101 engage support slots 114 of vertical plate 105, and in-service pipeline 40 projects through pipeline slot 116 of enclosure 101 allowing enclosure 101 to be displaced with respect to in-service pipeline 40.

Although in FIGS. 3–5 support slots 114 and pipeline slot 116 are shown as being straight, in another preferred embodiment support slots 114 and pipeline slot 116 are arcuate and each vertical plate 105 is coupled to each enclosure 101 at a pivot point. Thus, in this preferred embodiment, the arcuate support slots and arcuate pipeline slots allow enclosures 101 to pivot with respect to the pivot point instead of shifting sideways with respect to in-service pipeline 40 as in the embodiment of FIGS. 3–5. Furthermore, although FIGS. 3 and 5 show o-rings 124 sealing facing surfaces 110 to enclosure mounting surfaces 103, enclosure mounting surfaces 103 may be sealed to facing surfaces 110 in any suitable manner.

As shown in FIGS. 3 and 5, pipeline element support devices 85, comprising electrofusion positioning sleeves 120 inserted in cylindrical support flanges 83, which extend through support openings 82 of enclosure wall 16 of each enclosure 101, hold and secure pipeline element 50. Electrofusion fittings 92 of electrofusion connecting devices 80 surround the periphery of sections of pipeline element 50 and are enclosed by enclosures 101, electrofusion positioning sleeves 120, and cylindrical support flanges 83.

FIG. 4 shows cutting element 58, having perforated side face 59, extending through pipe section 45. After cutting through pipe section 45 in both enclosures 101, enclosures 101 may be shifted sideways with respect to in-service pipeline 40 so that the section of in-service pipeline 40 between enclosures 101 is removed from in-service pipeline 40 and ends of pipeline element 50 line up with cut ends of pipe section 45, as shown in FIG. 5. Electrofusion positioning sleeves 120 are then shifted towards interior chamber 118 causing electrofusion fittings 92 to slide over abutting ends of pipeline element 50 and pipe section 45. After electrofusion fittings 92 sealably connect pipe section 45 to pipeline element 50, support structure 100, enclosures 101, and vertical plates 105 may be removed and reused at another in-service pipeline location.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. A removable apparatus for upgrade of an in-service pipeline comprising:

enclosure means for temporarily enclosing a pipe section of the in-service pipeline for repairing said pipeline;

said enclosure means comprising at least one enclosure having a top section and a bottom section;

said top and bottom sections sealably disposable around said pipe section and sealably securable to each other; and at least one of insertion means for inserting a pipeline element between a pair of pipeline sections and having pipeline connection means for connecting said pipeline element to said pipeline sections and repair means for repairing said pipeline sections disposed within said enclosure, said connection means comprising electrofusion means for fusing an electrofusion fitting of said pipeline element to said sections for securing aid pipeline element to said pipeline sections.

2. An apparatus in accordance with claim 1, wherein said bottom section of said enclosure is sized to receive a removed portion of said pipe section.

3. An apparatus in accordance with claim 1, wherein said top section of said enclosure is sized to contain said at least one of said insertion means and said repair means.

4. An apparatus in accordance with claim 1, wherein said top section is sized to contain at least one said pipeline element.

5. An apparatus in accordance with claim 1 further comprising pressure relief means for relieving pressure within said enclosure.

6. An apparatus in accordance with claim 1 further comprising purge means for purging the inside of said enclosure.

7. An apparatus in accordance with claim 1, wherein said insertion means comprises cutting means for cutting said pipe section, cutting device positioning means for positioning said cutting means, pipeline element positioning means for positioning said pipeline element, connection device positioning means for positioning said connection device within said enclosure, and drive means for driving said cutting means.

8. An apparatus in accordance with claim 1, wherein said enclosure means further comprises viewing means for viewing the interior of said enclosure.

9. An apparatus in accordance with claim 7, wherein said cutting means comprise a cutting element selected from the group consisting of a curved edged blade, a straight edged blade, a circular blade, and a drill.

10. An apparatus in accordance with claim 9, wherein said cutting means comprise at least one of means for ultrasonically vibrating said cutting element and means for heating said cutting element.

11. An apparatus in accordance with claim 9, wherein said cutting element has one of a perforated side face, and a side face with a sufficient surface area to close off an open end of said in-service pipe section.

12. An apparatus in accordance with claim 7, wherein said connection device positioning means comprise a positioning element selected from the group consisting of a movable fork and a screw drive.

13. An apparatus in accordance with claim 1, wherein said enclosure means comprises two said enclosures connected by a support structure, said at least one of said insertion means and said repair means disposed within each of said enclosures.

14. An apparatus in accordance with claim 13 further comprising means for displacing said two enclosures in tandem around said in-service pipeline.

* * * * *